United States Patent
Noe et al.

(10) Patent No.: US 6,448,764 B2
(45) Date of Patent: Sep. 10, 2002

(54) METHOD OF AND APPARATUS FOR CONTACTLESS PLANARITY MEASUREMENTS ON FERROMAGNETIC METAL STRIP

(75) Inventors: Rolf Noe, Mühlheim/Ruhr; Andreas Noe, Kerken; Dieter Baukloh; Stefan Sonntag, both of Duisburg, all of (DE)

(73) Assignee: BWG Bergwerk- und Walzwerk-Maschinenbau GmbH, Duisburg (DE)

( * ) Notice: Subject to any disclaimer, the term of this patent is extended or adjusted under 35 U.S.C. 154(b) by 0 days.

(21) Appl. No.: 09/760,368

(22) Filed: Jan. 11, 2001

(30) Foreign Application Priority Data

Jan. 12, 2000 (DE) .......................... 100 00 845

(51) Int. Cl.$^7$ ............................ G01B 7/24; G01R 33/18
(52) U.S. Cl. ........................................ 324/209; 324/233
(58) Field of Search ................................ 324/209, 222, 324/223, 243, 240; 73/601, 570, 760

(56) References Cited

U.S. PATENT DOCUMENTS 4,634,976 A * 1/1987 Titto ........................ 324/240
5,028,869 A * 7/1991 Dobmann et al. ............ 324/223
5,640,088 A * 6/1997 Sasahara et al. ............ 324/209

FOREIGN PATENT DOCUMENTS

| DE | 199 11 548 | 11/2000 |
|---|---|---|
| EP | 365 622 | 5/1990 |

* cited by examiner

*Primary Examiner*—Edward Lefkowitz
*Assistant Examiner*—Subhash Zaveri
(74) *Attorney, Agent, or Firm*—Herbert Dubno

(57) ABSTRACT

A method and apparatus for the contactless determination of planarity and a ferromagnetic metal strip during transit of the strip through a strip-processing line or cold-rolling line. Hysteresis loops repetitively impressed in the metal strip and the tangential magnetic field strength is measured at a surface thereof and electromagnetic parameters are determined from the time course of the tangential field strength signal. The parameters are functions of the mechanical stress which is evaluated to determine residual intrinsic stress distribution and then the planarity or nonplanarity of the strip.

17 Claims, 5 Drawing Sheets

METHOD OF AND APPARATUS FOR CONTACTLESS PLANARITY MEASUREMENTS ON FERROMAGNETIC METAL STRIP

FIELD OF THE INVENTION

Our present invention relates to a method for contactless planarity measurement on metal strip of ferromagnetic materials. The invention also relates to an apparatus for that purpose.

BACKGROUND OF THE INVENTION

Planarity measurements made on metal strip are important to determine the stress distribution in such strip over the width thereof and have been made heretofore, inter alia, by planarity measurement rollers. The stress distribution is determined from the planarity measurement. The planarity measurement rollers provide an indirect measure of planarity because they effectively respond to length differences at different locations across the width of the strip.

It is also possible to effect direct measurement of a planarity of a metal strip when the latter is at standstill and thus is not in a tensioned state.

It is desirable to be able to effect a determination of planarity while the metal strip is in transit along a strip-rolling line or a cold-rolling line. For example, in open German application DE 199 11 548 A1, there is described a contactless planarity measurement as effected on metal strip in a course of travel along strip processing line in a cold-rolling plant.

In that system, longitudinal sound waves and/or transverse sound waves are coupled to the strip from an ultrasonic source and the transit time of the longitudinal waves and/or the transverse waves can be measured. Based upon variations in the speed of sound encountered by the longitudinal and/or transverse waves, at least the longitudinal and/or transverse stress distribution of the longitudinal stresses integrated over the strip thickness are determined.

OBJECTS OF THE INVENTION

It is the principal object of the present invention to provide a method for contactless planarity measurement of metal strip of ferromagnetic composition which can be carried out on line to yield a reliable and exact planarity measurement in an inexpensive manner with contact equipment simply and rapidly.

A further object of this invention is to provide a method for the purposes described which can have greater accuracy than earlier planarity measurements and which will be less effected by environmental conditions such as temperature fluctuation.

It is also an object of this invention to provide an apparatus for carrying out the planarity measurement in a simple and reliable manner.

SUMMARY OF THE INVENTION

These objects are achieved, in accordance with the invention, in a method for the contactless determination of planarity of a metal strip composed of ferromagnetic substances in the course of travel of the strip through a strip-processing line.

The metal strip is magnetized in a magnetic field generated by an exciting electromagnet supplied with alternating current so that a hysteresis loop, visualizable as a hysteresis curve, is impressed on the metal strip with the frequency of the alternating current, i.e. a multiplicity of times.

The tangential magnetic field strength at the strip surface is detected by means of a magnetic field strength sensor while the hysteresis loop magnetization is effected on line and in the course of travel of the strip (for reference to systems utilizing alternating current excitation and the detection of tangential magnetic field strength for other applications and purposes, reference may be had to U.S. Pat. No. 5,028,869).

During the impressing of the hysteresis magnetization on the strip, a signal is generated with a time course following the time course of the tangential magnetic field strength and with an amplitude representing the tangential magnetic field strength.

For determination of the longitudinal residual intrinsic stress from the hysteresis curve, variations in the beat (heterodyne) permeability ($\mu_\Delta = \Delta B/\Delta H$) in dependence upon the tangential magnetic field strength are detected and as measurement parameters, maximum ($\mu_{\Delta max}$) of the changing beat permeability, the associated value ($H_{c\mu}$) of the tangential magnetic field strength and/or the spread or width of the beat permeability ($\Delta H_\mu$) of the magnetic field strength are determined and then from the changes in these parameters as a function of mechanical stress, at least the longitudinal and/or transverse stress distribution of the longitudinal stresses integrated over the strip width are determined and from these stress distributions a corresponding longitudinal residual intrinsic stress distribution and the resulting nonplanarity in the metal strip is obtained.

Alternatively the determination of the longitudinal residual intrinsic stress can be based upon a harmonic analysis of the time signal of the tangential magnetic field strength, i.e. the aforementioned signal, the distortion factor K and/or the coercivity field strength ($H_{CO}$), the distortion factor and the coercivity field strength being measured parameters which are determined.

From the changes in these parameters as functions of the mechanical stress at least the longitudinal and/or transverse stress distribution of the longitudinal stress integrated over the strip thickness are determined and from these stress distributions the corresponding longitudinal residual intrinsic stress distortion and the resulting nonplanarity in the metal strip can be obtained.

Of course both of these processes can be combined. In the first case the beat permeability itself represents small variations in the applied magnetic field and these variations are typical of the applied magnetic field. The maximum ($\mu_{\Delta max}$) of the curve of variation of beat permeability, the associated value ($H_{c\mu}$) of the tangential magnetic field strength and the width of the variation curve ($\Delta H_\mu$) are electromagnetic parameters which vary as the magnetic field runs through the hysteresis loop with repetitive excitation as reflected in deviations from an initial sine-shaped pattern. These deviations can be evaluated by a Fourier analysis of the time signal (see U.S. Pat. No. 5,028,869 and EP 0 365 622). The resulting parameters can include the distortion factor K coercivity field strength ($H_{CO}$.)

In all of the cases described, these measured parameters and their variations are a function of the mechanical stresses. By their combination, i.e. a combination of a plurality of these electromagnetic parameters, it is possible to obtain a plurality measurement in a contactless manner which is surprisingly independent of the different ferromagnetic workpiece compositions and their lattice structures and strength characteristics including the elastic limit and the tensile strength.

Furthermore, it is surprising that by the use of a plurality of these electromagnetic parameters for determining the longitudinal residual intrinsic stress, there is only minimal to negligible sensitivity to air gap changes between the measurement units and the travelling metal strip. The result is high measurement precision and a definite indication of the degree or extent of nonplanarity in the metal strip. Indeed, the contactless planarity measurement according to the invention can be carried out at temperatures up to 500° C. with the satisfactory precision.

According to a feature of the invention the changes in the measurement parameters are used to give the longitudinal and/or transverse stress distribution resulting from the transverse stresses integrated over the strip thickness and from this stress distribution both the transverse and longitudinal residual intrinsic stress distributions and any resulting nonplanarity are determined.

As the measurement parameters we can use those which result from the variation of the beat permeability with the tangential magnetic field strength as well as those electromagnetic parameters which result from the harmonic analysis of the time signal of the tangential magnetic field strength.

According to a feature of the invention over the width of the strip and/or the strip length 80 to 800 measurements per second are taken to determine the changes in the parameters.

It is also possible in accordance with the invention to determine the elastic limit of the strip material and the tension, for example, alternatingly with the determination of the electromagnetic measurement parameters and the nonplanarity resulting therefrom and with the same or similar measuring devices. Preferably the measurements are taken on the upper and/or lower sides of the strip. The air gap between the measuring device or measuring devices can be varied as a function of the strip thickness, each measuring device comprising advantageously an electromagnet and a magnetic field strength sensor.

The contactless planarity measurement can be used with strip thicknesses up to about 5 mm. The magnetization of the traveling metal strip for capturing and evaluating the electromagnetic measurement parameters can be effected by traversing the measurement device over the width of the strip or in several different directions in the strip plane, e.g. in the longitudinal direction of the strip, transversely of the strip and diagonally with respect to the strip and the measuring devices can be movable or stationary for that purpose. When the measuring devices are stationary, a plurality of them can be provided across the strip or in a diagonal or other pattern.

The invention also includes an apparatus for carrying out the methods described and having at least one electromagnet with an excitation coil for impressing the hysteresis loop magnetization of the metal strip and the magnetic field strength sensor for detecting the tangential magnetic field strength. The latter is connected to a circuit for evaluating the time course of the tangential magnetic field strength and determining the electromagnetic measurement parameters.

According to the invention the electromagnet and the magnetic field strength sensor are arranged above and/or below the strip surface as the strip travels along its path and at a predetermined distance from that surface. The magnetic poles of the U-shaped or yoke-like electromagnet and the magnetic field sensor between the two magnet poles are disposed in the same plane.

The electromagnet and the magnetic field strength sensor can form a unit which can be raised and lowered and can be mounted on a common lifting device whereby different air gaps between the measurement unit and the strip can be provided.

In general, there will be a greater gap or lift off in the case of thinner metal strip than for thicker metal strip since thinner metal strip generally is more corrugated than thinner metal strip.

Preferably a multiplicity of electromagnets and magnetic field sensors can be provided over the width of the strip. The electromagnets and magnetic field sensors may be oriented in different directions, i.e. along the strip length, transversely of the strip and diagonally with respect to the strip as may be desired.

One or more electromagnets and respective magnetic field sensors can be provided on one or more carriages which can traverse the units across the width of the strip and the electromagnets and electromagnetic field sensors can be provided in or on rollers engaging the strip including deflection rollers about which the strip passes or planarity measurement rollers or the like.

The method of the invention for contactless determination of planarity of a ferromagnetic metal strip in transit along a strip-processing or cold-rolling line, can comprise the steps:
(a) exciting in the metal strip a magnetic field having a hysteresis loop with a exciter driven by alternating current and juxtaposed with the strip and periodically repeating at a frequency of the alternating current;
(b) detecting a tangential magnetic field strength resulting from the magnetic field at a surface of the metal strip with a magnetic field strength sensor while the hysteresis loop is driven by the exciter;
(c) producing a signal whose time course represents a time course of the tangential magnetic field strength while the hysteresis loop is driven by the exciter;
(d) detecting changes in a beat permeability ($\mu_\Delta = \Delta B/\Delta H$) as a function of the tangential magnetic field strength and determining as measurement parameters at least two parameters selected from a maximum ($\mu_{\Delta max}$) of the changes in beat permeability, an associated value ($H_{c\mu}$) of the tangential magnetic field strength and a width of a curve representing change ($\Delta H_\mu$) in the beat permeability of the magnetic field strength as a function of time;
(e) from variations in the measurement parameters as functions of mechanical stresses in the strip, determining at least one stress distribution from among a longitudinal stress distribution and a transverse stress distribution of the longitudinal stress integrated over a strip thickness; and
(f) from the determined stress distribution, determining a corresponding longitudinal residual intrinsic stress distribution and a resulting degree of nonplanarity of the metal strip.

The method of the invention for contactless determination of planarity of a ferromagnetic metal strip in transit along a strip-processing or cold-rolling line can comprise the steps:
(a) exciting in the metal strip a magnetic field having a histeresis loop with a exciter driven by alternating current and juxtaposed with the strip and periodically repeating at a frequency of the alternating current;
(b) detecting a tangential magnetic field strength resulting from the magnetic field at a surface of the metal strip with a magnetic field strength sensor while the hysteresis loop is driven by the exciter;
(c) producing a signal whose time course represents a time course of the tangential magnetic field strength while the hysteresis loop is driven by the exciter;

(d) effecting a harmonic analysis of the signal to determine at least one measurement parameter selected from a distortion factor (K) and a coercivity field strength ($H_{CO}$);

(e) from variations in the measurement parameters as functions of mechanical stresses in the strip, determining at least one stress distribution from among a longitudinal stress distribution and a transverse stress distribution of the longitudinal stress integrated over a strip thickness; and (f) from the determined stress distribution, determining a corresponding longitudinal residual intrinsic stress distribution and a resulting degree of nonplanarity of the metal strip.

The apparatus for contactless determination of planarity of a ferromagnetic metal strip in transit along a strip-processing or cold-rolling line can comprise:

at least one electromagnet having an excitation coil and juxtaposed with at least one surface of the strip at a predetermined distance therefrom as the strip is displaced along the line and energized by alternating current to excite in the metal strip a magnetic field having a hysteresis loop and periodically repeating at a frequency of the alternating current;

a magnetic field strength sensor juxtaposed with at least one surface of the strip at a predetermined distance therefrom for detecting a tangential magnetic field strength resulting from the magnetic field while the hysteresis loop is driven by the electromagnet; and a circuit connected to the magnetic field strength sensor for producing a signal whose time course represents a time course of the tangential magnetic field strength while the hysteresis loop is driven by the electromagnet.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
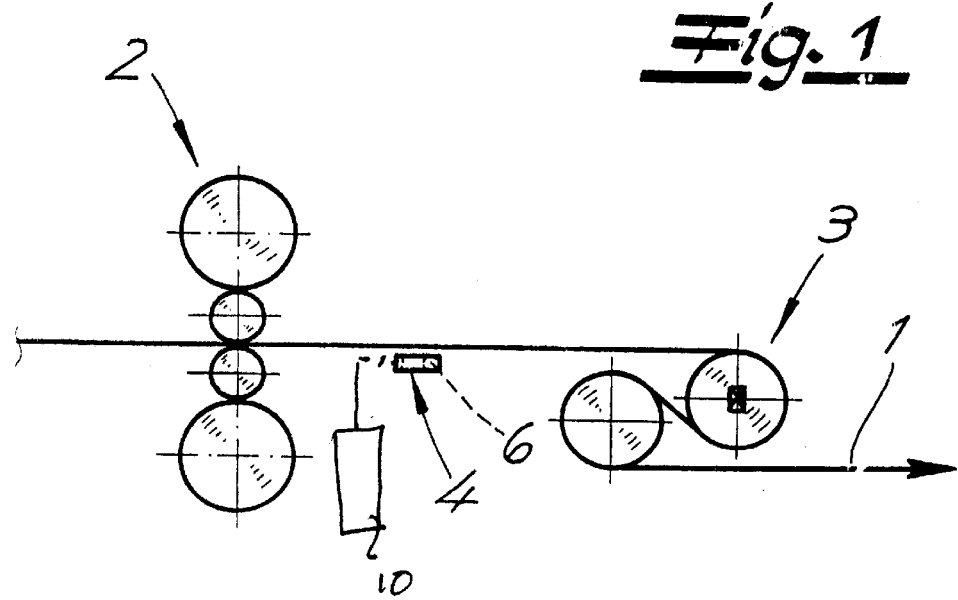
FIG. 1 is a schematic side elevational view illustrating an apparatus for contactless on-line measurement of planarity of a metal strip.

The drawing shows an apparatus for the contactless measurement of the planarity of metal strip 1 composed of ferromagnetic material in the course of the travel of the strip along a strip-processing line or a cold-rolling line. For example, such a line can include a dressing mill 2 and a bridle 3 between which the planarity measurement is effected. For this purpose, below the lower surface of the metal strip 1 at a predetermined distance therefrom an electromagnet with an exciting coil 5 is provided for producing a magnetization of the strip in a hysteresis loop which can be represented by a hysteresis curve, e.g. of the type shown in FIG. 5. A magnetic field sensor 6 is part of the measuring device and serves for capturing the tangential magnetic field strength. The principle of such exciting and detection is developed, for example, in U.S. Pat. No. 5,028,869.

The magnetic field strength sensor 6 is connected in a circuit, represented only diagrammatically at 7, for evaluating the time course of the tangential magnetic field strength signal and for determination of the electromagnetic measurement parameter mentioned previously. In the embodiments shown in FIGS. 1 and 2, the electromagnet 4 and the magnetic field strength sensor 6 are, in the embodiments of FIGS. 1 and 2, located below the strip across an air gap. The magnetic poles 8 of the U-shaped yoke of the electromagnet are located in the same plane as the magnetic field strength sensor 6. The electromagnet 4 and the sensor 6 are a unit which can be raised and lowered on a lifting device 10 (FIG. 1).

Figure 2:
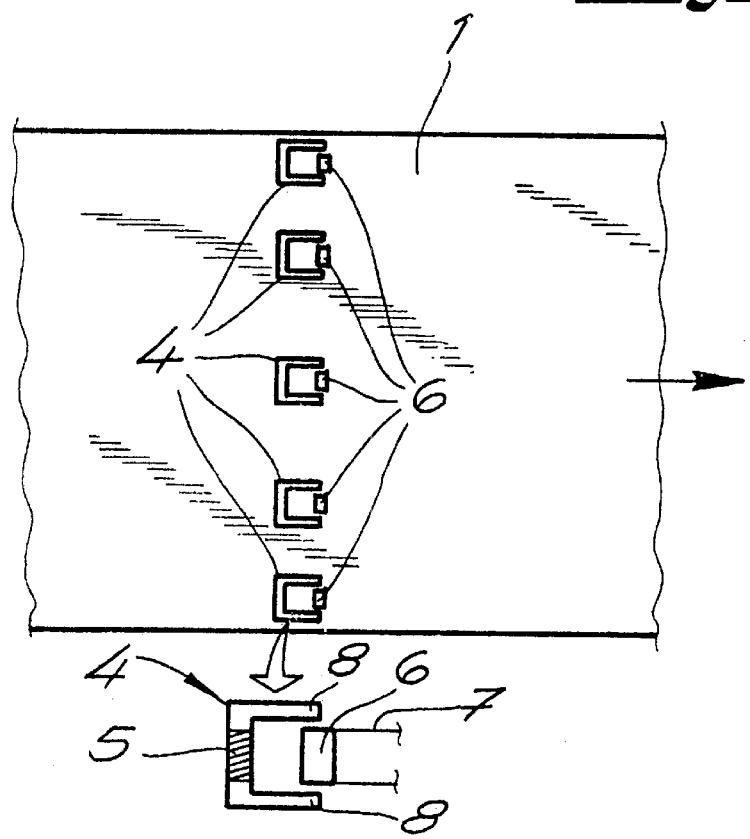
FIG. 2 is a bottom view of the apparatus of FIG. 1 showing stationary electromagnets and magnetic field strength sensors.

As shown in FIG. 2, a multiplicity of electromagnets 4 and respective magnetic field strength sensors 6 can be provided in spaced-apart relationship across the width of the metal strip.

Figure 3:
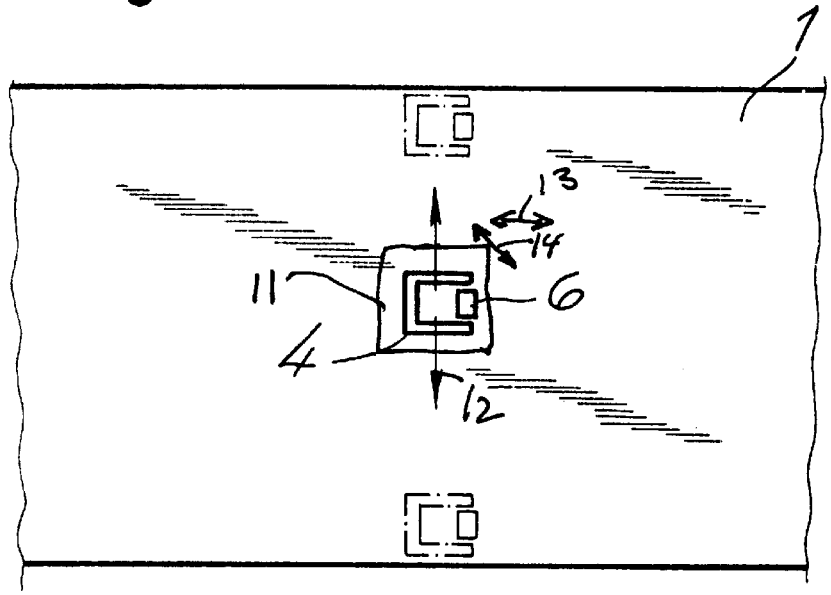
FIG. 3 is a bottom view illustrating an alternative in which the electromagnet and field strength sensor is traversed across the width of the strip.

As can be seen in FIG. 3, as an alternative, the electromagnet 4 and the magnetic field strength sensor 6 can be provided on a carriage 11 which can be traversed as shown by the arrows 12 across the width strip. The traversing movement has been shown only by way of example and as the arrows 13 and 14 show, the traversing directions can also be in the longitudinal direction of the strip or diagonally along the latter.

Figure 4:
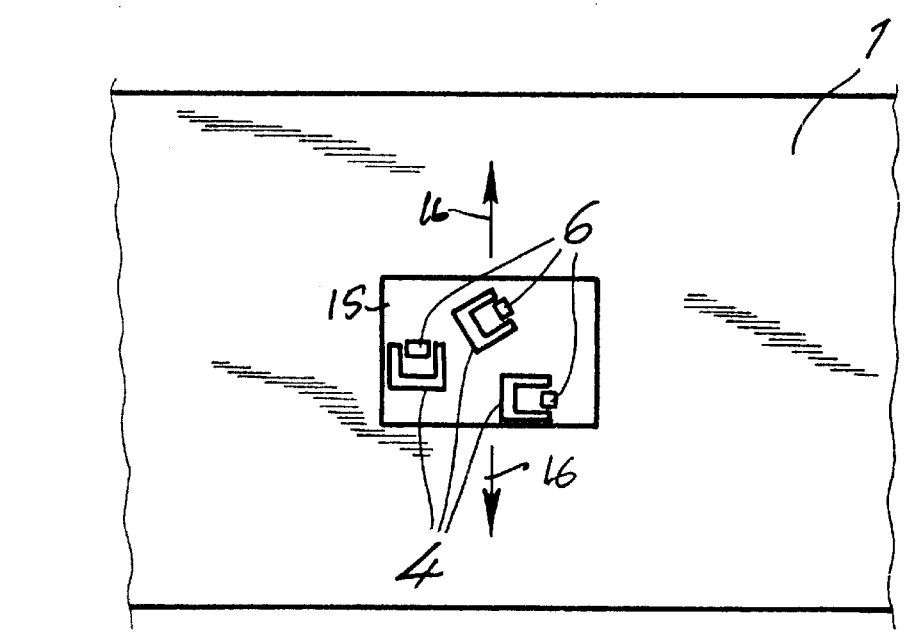
FIG. 4 shows another embodiment in a view similar to FIG. 3 with a traversing carriage.

FIG. 4 shows that the electromagnets 4 and the sensors 6 may have various orientations so that the magnetic field axis can be transverse to the direction of movement of the strip or in that direction of movement or diagonally with respect thereto. The measurement units are here also provided on a traversing carriage 15 displaceable in the direction represented by the arrows 16.

Figure 5:
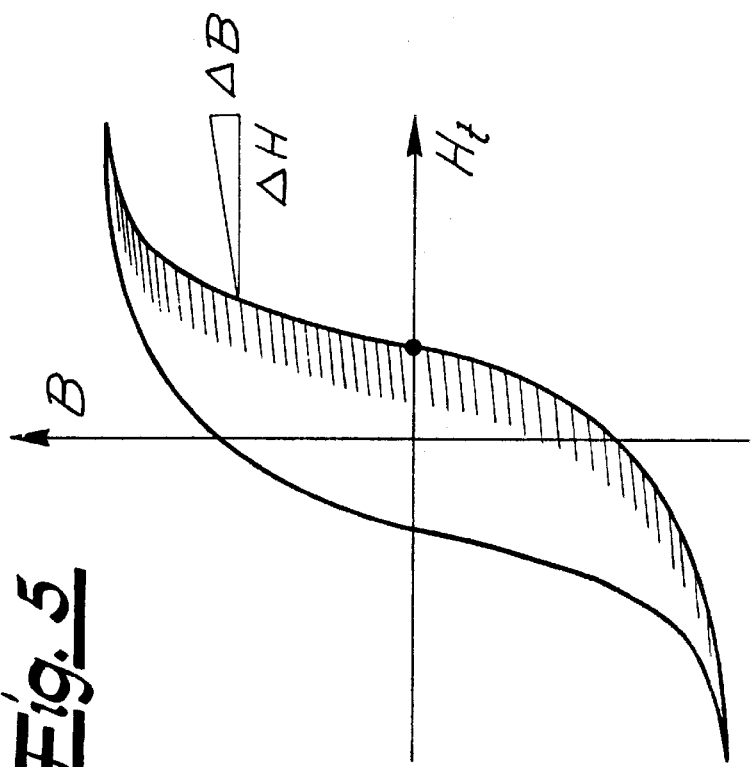
FIG. 5 is a graph showing the hysteresis curve representing the hysteresis loop and defining the beat permeability.
Figure 6:
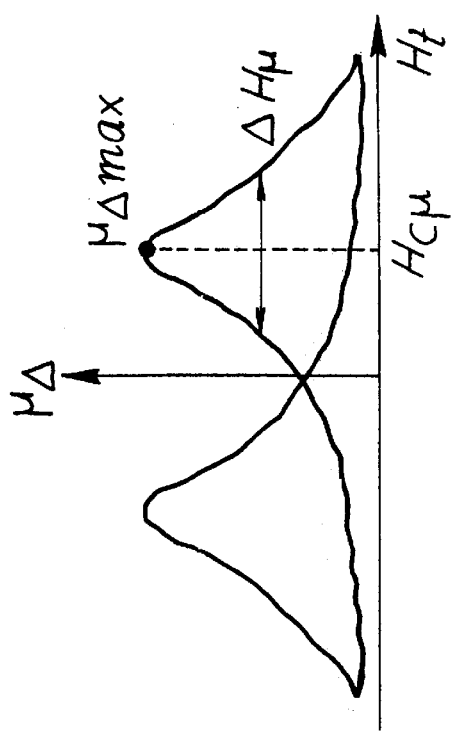
FIG. 6 is a graph showing the change in beat permeability as a function of the tangential magnetic field strength.

FIG. 5 shows the definition of the beat or heterodyne permeability $\mu_\Delta = \Delta B/\Delta H$ on the hysteresis curve, tangential magnetic field strength being represented at $H_t$ along the abscissa while B is represented along the ordinate. Graphs of the changes in the beat permeability as a function of the tangential magnetic field strength are shown in FIG. 6 and from this Figure one can see the derivation of the maximum $\mu_{\Delta max}$ and the associated value $H_{c\mu}$ of the tangential magnetic field strength. The width of the variation curve has been represented at $\Delta h_\mu$.

Figure 7:
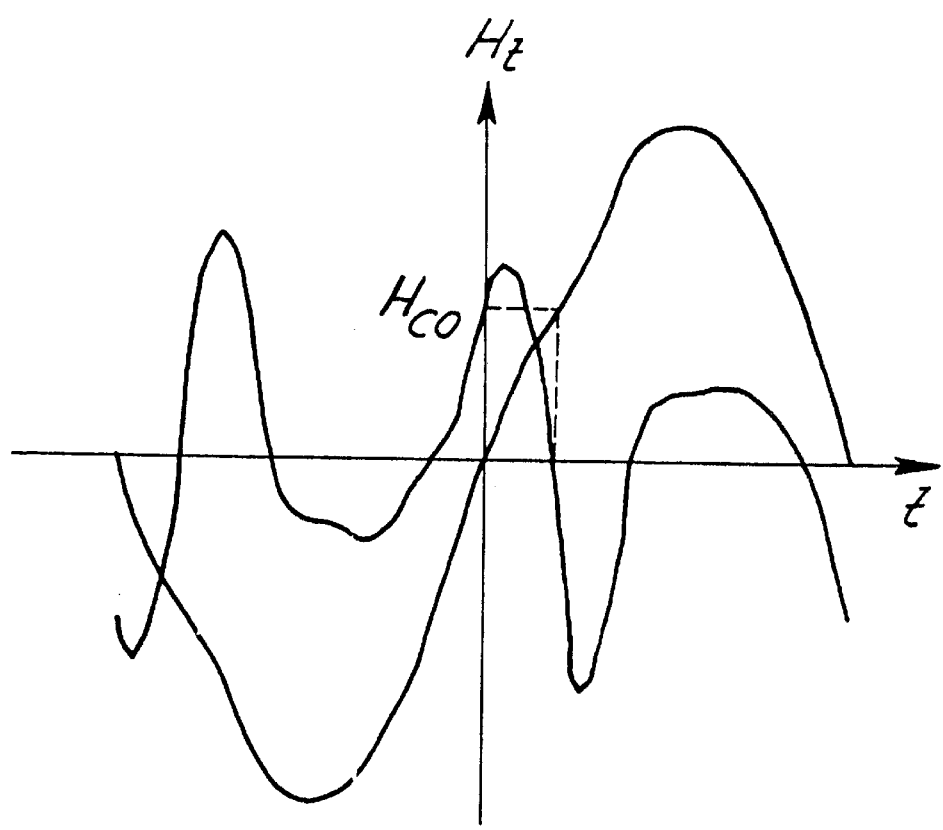
FIG. 7 is a graph showing the sinusoidal time course of the magnetic field strength signal for the harmonic analysis of the time signal of the tangential magnetic field strength.
Figure 9:
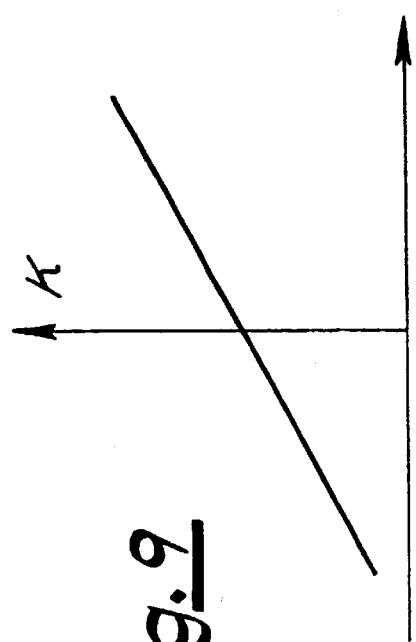
FIGS. 8–11 are graphs showing the influence of the mechanical stress on the various electromagnetic parameters.
Figure 11:
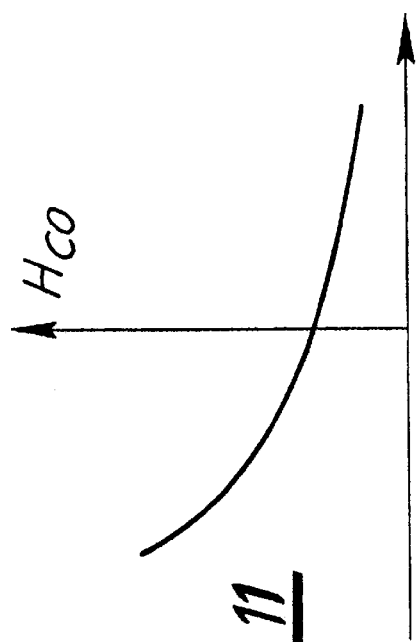
Figure 8:
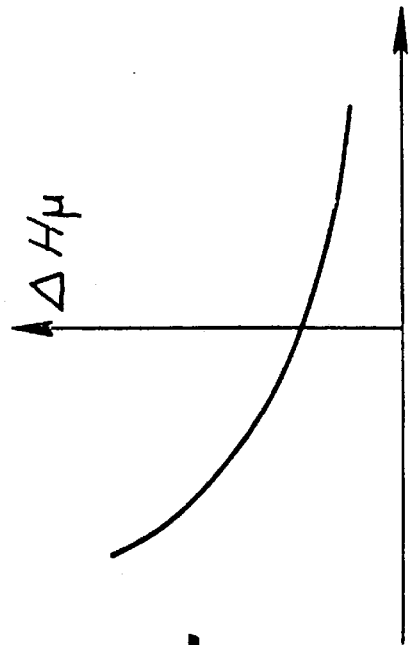
Figure 10:
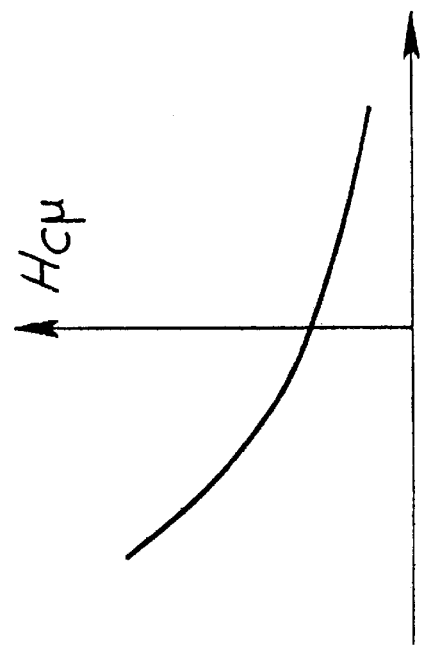

FIG. 7 graphs the measured parameters as a function of time and with alternating magnetization and decay of the magnetization in the hysteresis loop deviations occur from the initial sinusoidal pattern. These deviations are evaluated by Fourier analysis to obtain the distortion factor K and the coercivity field strength $H_{CO}$ as electromagnetic parameters (see U.S. Pat. No. 5,028,869). These measured parameters are plotted in FIGS. 8–11 against the mechanical stress shown without numerical values along the abscissa. From these values the longitudinal stress distribution and/or transverse stress distribution are obtained and the corresponding longitudinal residual intrinsic stress distribution and degree of nonplanarity of the metal strip are established.

We Claim:

1. A process for contactless determination of planarity of a ferromagnetic metal strip in transit along a strip-processing or cold-rolling line, said process comprising the steps of:

(a) exciting in said metal strip a magnetic field having a hysteresis loop with a exciter driven by alternating current and juxtaposed with said strip and periodically repeating at a frequency of said alternating current;

(b) detecting a tangential magnetic field strength resulting from said magnetic field at a surface of said metal strip with a magnetic field strength sensor while said hysteresis loop is driven by said exciter;

(c) producing a signal whose time course represents a time course of said tangential magnetic field strength while said hysteresis loop is driven by said exciter;

(d) detecting changes in a beat permeability ($\mu_\Delta = \Delta B/\Delta H$) as function of the tangential magnetic field strength and determining as measurement parameters at least two parameters selected from a maximum ($\mu_{\Delta max}$) of the changes in beat permeability, an associated value ($H_{c\mu}$) of the tangential magnetic field strength and a width of a curve representing change ($\Delta H_\mu$) in said beat permeability of the magnetic field strength as a function of time;

(e) from variations in said measurement parameters as functions of mechanical stresses in said strip, determining at least one stress distribution from among a longitudinal stress distribution and a transverse stress distribution of the longitudinal stress integrated over a strip thickness; and (f) from the determined stress distribution, determining a corresponding longitudinal residual intrinsic stress distribution and a resulting degree of nonplanarity of the metal strip.

2. A process for contactless determination of planarity of a ferromagnetic metal strip in transit along a strip-processing or cold-rolling line, said process comprising the steps of:

(a) exciting in said metal strip a magnetic field having a hysteresis loop with a exciter driven by alternating current and juxtaposed with said strip and periodically repeating at a frequency of said alternating current;

(b) detecting a tangential magnetic field strength resulting from said magnetic field at a surface of said metal strip with a magnetic field strength sensor while said hysteresis loop is driven by said exciter;

(c) producing a signal whose time course represents a time course of said tangential magnetic field strength while said hysteresis loop is driven by said exciter;

(d) effecting a harmonic analysis of the signal to determine at least one measurement parameter selected from a distortion factor (K) and a coercivity field strength ($H_{CO}$);

(e) from variations in said measurement parameters as functions of mechanical stresses in said strip, determining at least one stress distribution from among a longitudinal stress distribution and a transverse stress distribution of the longitudinal stress integrated over a strip thickness; and (f) from the determined stress distribution, determining a corresponding longitudinal residual intrinsic stress distribution and a resulting degree of nonplanarity of the metal strip.

3. The method defined in claim 1 or claim 2 wherein from changes in the measurement parameters the longitudinal and or transverse stress distribution of the transverse stress integrated over the strip thickness are determined and from the determined stress distribution the corresponding transverse residual intrinsic stress distribution and the resulting nonplanarity of the strip are obtained.

4. The method defined in claim 1 or claim 2 wherein the measurement parameters are obtained by 80 to 800 measurements per second over the width of the strip and/or the length thereof.

5. The method defined in claim 1 or claim 2, further comprising the step of determining the yield limit and/or the strip tension of said strip alternately with determination of planarity.

6. The method defined in claim 1 or claim 2 wherein the measurements are taken along the upper surface and/or the lower surface of the strip.

7. The method defined in claim 1 or claim 2 wherein the air gap between the sensor and the strip is varied as a function of the strip thickness.

8. The method defined in claim 1 or claim 2 wherein the magnetization and detection of the tangential magnetic field strength are effected by traversing said exciter and said sensor across a width of said strip.

9. The method defined in claim 1 or claim 2 wherein the magnetization and detection of the tangential magnetic field strength are carried out in a plurality of directions relative to said strip in a plane thereof.

10. The method defined in claim 1 or claim 2, further comprising calibrating a relationship between said measurement parameters and a longitudinal stress distribution by applying tension to a strip in a separate tension measurement device.

11. An apparatus for contactless determination of planarity of a ferromagnetic metal strip in transit along a strip-processing or cold-rolling line, comprising:

means in said line for displacing a ferromagnetic metal strip along a path along which planarity of said strip is to be measured;

at least one electromagnet along said path having an excitation coil and juxtaposed with at least one surface of said strip at a predetermined distance therefrom as said strip is displaced along said line and energized by alternating current to excite in said metal strip a magnetic field having a hysteresis loop and periodically repeating at a frequency of said alternating current;

a magnetic field strength sensor along said path juxtaposed with at least one surface of said strip at a predetermined distance therefrom for detecting a tangential magnetic field strength resulting from said magnetic field while said hysteresis loop is driven by said electromagnet; and a circuit connected to said magnetic field strength sensor for producing a signal whose time course represents a time course of said tangential magnetic field strength while said hysteresis loop is driven by said electromagnet whereby a harmonic analysis of the signal yields at least one measurement parameter selected from a distortion factor (K) and a coercivity field strength ($H_{CO}$), at least one stress distribution is determined from said parameter, and a longitudinal residual intrinsic stress distribution and degree of nonplanarity of the strip are calculated.

12. The apparatus defined in claim 11 wherein said electromagnet has magnetic poles lying in the same plane as said sensor.

13. The apparatus defined in claim 11 wherein said sensor and said electromagnet form a unit mounted for raising and lowering relative to said strip.

14. The apparatus defined in claim 11, further comprising a multiplicity of said electromagnets and a respective magnetic field strength sensor assigned to each electromagnet and spaced apart across the width of said strip.

15. The apparatus defined in claim 11 wherein a plurality of electromagnets and respective sensors are oriented in different directions relative to said strip.

16. The apparatus defined in claim 11, further comprising means for traversing said electromagnet and said sensor across said strip.

17. The apparatus defined in claim 11 wherein electromagnet and said sensor are mounted in a roller engaging said strip.

* * * * *